(12) United States Patent
Glasl et al.

(10) Patent No.: US 8,955,575 B2
(45) Date of Patent: Feb. 17, 2015

(54) ROLLER BLIND SYSTEM FOR A MOTOR VEHICLE

(75) Inventors: Sebastian Glasl, München (DE);
Christian Adlhoch, München (DE);
Horst-Martin Schulz, Weil (DE);
Engelbert Hirschvogel, Hofstetten (DE); Alexander Bergmiller, Königsbrunn (DE); Philip Oerke, München (DE)

(73) Assignee: Webasto AG, Stockdorf (DE)

( * ) Notice: Subject to any disclaimer, the term of this patent is extended or adjusted under 35 U.S.C. 154(b) by 1545 days.

(21) Appl. No.: 11/719,840

(22) PCT Filed: Nov. 7, 2005

(86) PCT No.: PCT/DE2005/001999
§ 371 (c)(1),
(2), (4) Date: May 21, 2007

(87) PCT Pub. No.: WO2006/053520
PCT Pub. Date: May 26, 2006

(65) Prior Publication Data
US 2009/0145559 A1      Jun. 11, 2009

(30) Foreign Application Priority Data

Nov. 19, 2004   (DE) .......................... 10 2004 055 999
May 30, 2005   (DE) .......................... 10 2005 024 657

(51) Int. Cl.
*A47G 5/02*     (2006.01)
*E06B 9/56*     (2006.01)
(Continued)

(52) U.S. Cl.
CPC .............. *B60J 7/0015* (2013.01); *B60J 1/2041* (2013.01); *B60J 1/2044* (2013.01); *B60J 1/2052* (2013.01); *B60R 5/047* (2013.01)
USPC ................... 160/273.1; 160/370.22; 296/97.8

(58) Field of Classification Search
USPC ................. 160/238, 266, 268, 272, 271, 270, 160/273.1
See application file for complete search history.

(56) References Cited

U.S. PATENT DOCUMENTS 1,882,982 A      10/1932   Schmiedeskamp
2,501,454 A *   3/1950    Schueren ................... 160/273.1
(Continued)

FOREIGN PATENT DOCUMENTS

DE         1 701 495 U      6/1955
DE         1 269 782 B      6/1968
(Continued)

OTHER PUBLICATIONS

International Search Report for International Application No. PCT/DE2005/001999.
(Continued)

*Primary Examiner* — Katherine Mitchell
*Assistant Examiner* — Jeremy Ramsey
(74) *Attorney, Agent, or Firm* — Roberts Mlotkowski Safran & Cole, P.C.; David S. Safran (57) ABSTRACT

A shade arrangement for a motor vehicle with at least one shade length and at least one roller tube for taking-up and unrolling the shade length, each side edge of the shade length having at least one flexible, flat guide strip which extends along the drawing direction of the shade and is guided in a guide. The guide contains a connecting link in which the guide strip is guided, and which has an exit gap through which the shade length emerges from the guide, the guide strip being guided such that its base surface is guided essentially parallel to the adjacent region of the shade length. The shaping and dimensioning of the exit gap and guide strip are such that the guide strip cannot emerge from the guide by itself. The shade length is connected to the roller tube via at least one constant force spring.

15 Claims, 9 Drawing Sheets

(51) Int. Cl.
*B60J 1/20* (2006.01)
*B60J 3/00* (2006.01)
*B60J 11/00* (2006.01)
*B60J 7/00* (2006.01)
*B60R 5/04* (2006.01)

(56) References Cited

U.S. PATENT DOCUMENTS

| | | | | |
|---|---|---|---|---|
| 3,017,927 | A * | 1/1962 | Demko | 160/271 |
| 4,330,022 | A * | 5/1982 | Bull et al. | 160/379 |
| 4,825,921 | A * | 5/1989 | Rigter | 160/23.1 |
| 5,163,495 | A | 11/1992 | Lichy | |
| 6,179,373 | B1 | 1/2001 | Bohm et al. | |
| 6,309,076 | B1 | 10/2001 | McVicker | |
| 6,598,653 | B1 * | 7/2003 | Gonzalez | 160/370.21 |
| 6,874,845 | B2 * | 4/2005 | Engl et al. | 296/214 |
| 6,899,380 | B2 * | 5/2005 | Kralik et al. | 296/214 |
| 7,114,766 | B2 * | 10/2006 | Becher et al. | 296/214 |
| 7,360,575 | B2 * | 4/2008 | Weiss | 160/273.1 |
| 7,387,329 | B2 * | 6/2008 | Mollick et al. | 296/97.8 |
| 2004/0144498 | A1 * | 7/2004 | Hudoba et al. | 160/31 |
| 2006/0027347 | A1 * | 2/2006 | Boehm et al. | 160/273.1 |

FOREIGN PATENT DOCUMENTS

| | | |
|---|---|---|
| DE | 79 17 517 U1 | 11/1980 |
| DE | 42 02 342 C1 | 3/1993 |
| DE | 198 34 777 A1 | 2/2000 |
| DE | 100 54 852 A1 | 5/2002 |
| DE | 203 09 690 U1 | 9/2003 |
| DE | 102 20 947 A1 | 11/2003 |
| DE | 10 2004 017 459 A1 | 10/2005 |
| DE | 10 2005 032 043 A1 | 1/2007 |
| EP | 1 553 259 A1 | 7/2005 |
| GB | 1 391 660 | 4/1975 |
| JP | 62-177893 U | 11/1987 |
| JP | 4-98999 U | 8/1992 |
| JP | 7-15997 U | 3/1995 |
| JP | 11-141250 A | 5/1999 |
| JP | 2002-120558 A | 4/2002 |
| WO | 2004/069011 A1 | 8/2004 |

OTHER PUBLICATIONS

Japanese Office Action Dafting Date Jun. 23, 2011, Patent Application No. 2007-541661, Corresponds to Present Application.

* cited by examiner

ROLLER BLIND SYSTEM FOR A MOTOR VEHICLE

BACKGROUND OF THE INVENTION

1. Field of the Invention

This invention relates to shade arrangements for a motor vehicle with at least one shade length and at least one roller tube for taking-up and unrolling the shade length, the shade length being guided along its side edge regions by at least one flexible, flat guide strip which extends along the drawing direction of the shade and is guided in a guide.

2. Description of Related Art

Shade arrangements for use in automotive construction are used, for example, as sun protection under a transparent vehicle body surface or also as a cover for the trunk space in a station wagon. These arrangements generally consist of a shade length which on its one end is wound onto a roller tube and which is tensioned by the reset force of the roller tube. The other end of the shade length is conventionally attached to a pull which can be moved by an electric drive or by hand, by which the shade length is accordingly drawn or rewound.

However, when the shade length on such a shade arrangement is tensioned only between the pull and the take-up roller, even with relatively high tension in this direction, for example, for a partially opened roof opening over the shade length the latter can flutter. Furthermore, the gap which is generally present in these embodiments on the edge of the shade length can be optically disruptive.

To overcome these disadvantages, shade systems are known in which the shade length is tensioned not only along its drawing direction, but also transversely thereto. Thus, for example, German Patent Application DE 197 39 919 A1 and corresponding U.S. Pat. No. 6,179,373 describe a shade arrangement in which the side edges of a length of shade are made such that they engage laterally attached, body-mounted guide rails such that they can be easily moved in the opening and closing motion of the shade, but cannot be pulled out of the guide rails transversely to the direction of shade motion. Thus, the edge regions of the shade length are protected against fluttering and vibration movements and at a corresponding distance of the guide rails on both sides compared to the width of the shade length the latter can be tensioned transversely to the drawing direction. The side edges of the shade length are provided with edge stiffeners for this purpose which can be kinked for engaging angled guide regions relative to the plane of the shade length, but for taking up the shade length onto the roller tube they can be returned to their extended, unkinked flat position.

The above described shade arrangement, on the one hand, has the disadvantage that continuous bending of the edge stiffening along the bending line generates a critical region along which the shade arrangement or edge stiffening can be damaged and even tear by material fatigue. On the other hand, to guide this edge stiffening a connecting link is required which borders the edge stiffening as it is guided and thus cannot be extruded; this increases construction and installation costs for this guide.

One aspect of the invention relates especially to the spring for tensioning the shade length in the drawing direction of the shade. To keep the shade length tensioned in any position in this lengthwise direction, in conventional shade arrangements the roller tube is connected to a central take-up shaft which is supported on the body within the roller tube via a reset spring, such as, for example, a torsion spring. This system is disclosed, for example, in German Patent DE 198 34 777 C2. With the shade length drawn, a tension force is applied to the shade length by such a reset spring via the roller tube. However, the disadvantage in this arrangement is the reset force of a torsion spring which varies greatly depending on the drawing length of the shade length.

SUMMARY OF THE INVENTION

The object of this invention is to devise a shade arrangement for a motor vehicle in which the aforementioned disadvantages are avoided.

This object is achieved by shade arrangements as described below.

In achieving the object in accordance with the invention, a shade length along the two side edge regions has at least one flexible, flat guide strip each, which extends along the drawing direction of the shade and is guided in a guide. The guide contains a connecting link in which the guide strip is guided, and which, furthermore, has an exit gap through which the shade length emerges from the guide, the guide strip being guided such that its base surface is guided essentially parallel to the adjacent region of the shade length and the shaping and dimensioning of the exit gap and guide strip are such that the guide strip cannot emerge from the guide by itself.

It is advantageous in this invention that, here, the guide strip of the shade length when the shade length is being drawn need not be bent over and when the shade length is being taken up on the roller tube it must be laid flat again, by which the corresponding material fatigue is avoided. Furthermore a connecting link which controls this bending-over is not needed, by which simple and cheaply produced guide rails can be used. With this arrangement, it is especially also possible to tension very long and possibly narrow shade lengths only transversely to the drawing direction and thus to reliably avoid winding folds.

Preferably, the guide strip is guided in a guide channel within the guide, the bottom of the guide channel running in a plane parallel to the drawn shade length.

In one especially preferred embodiment of the invention, to prevent the guide strip from slipping out of the exit gap, the opening width of the exit gap is smaller than the height of the guide strip.

Alternatively, slipping-out can also be prevented by the opening width of the exit gap being smaller than the width of the base surface of the guide strip and the guide strip covering the opening. Here, the guide strip is preferably supported on both edges of the exit gap.

In another preferred configuration of the invention, the shade length is fixed at one point along the transverse extension of the guide strip, preferably in the region of the center on the guide strip.

In a likewise especially preferred embodiment, the opening of the exit gap is likewise smaller than the width of the base surface of the guide strip and the cross section of the guide strip is supported in this case on at least two points on the guide channel against twisting around its lengthwise axis. The guide strip covers the exit gap from one side here. In this connection, the shade length is fixed preferably in the region of one side edge of the guide strip. In another configuration of these versions the shade length is attached on the side of the guide strip opposite the exit gap and is deflected by its side edge.

In preferred embodiments of the invention, the guide strip is guided in the guide channel of the guide which can be made cross-shaped. The guide strip can further be directly connected to the guide or a slide rail can be placed between the guide strip and the guide and can be attached to the guide. In the latter case, by the corresponding choice of materials of the slide rail and guide strip both the friction and also the noise development in the movement of the shade length can be reduced.

Other advantageous embodiments of the invention have spring elements between the guide strip and guide or between the slide rail and guide which equalize distance tolerances, for example, between the guides on either side of the shade length. These spring elements can are formed, for example, of spring steel or foam.

To attach the guide strip on the shade length, there is, on the one hand, the possibility that the guide strip is inserted simply in the turned-down region of the shade length in its edge zone and is held there by clamping action. On the other hand, the edge of this cuff can also be connected securely to the shade length, preferably sewed or bonded, and can thus form a pocket in which the guide strip runs. In other, alternative embodiments of the invention the guide strip can be cemented into the cuff (for example, by means of a two-sided adhesive tape or a cement, especially a liquid cement) or the guide strip can also be cemented directly onto the shade length without folding down the shade length. It goes without saying that alternative forms of attachment are possible. In particular, extrusion of the guide strip onto the shade length should be mentioned here, in the extrusion of the guide strip at the same time its attachment also being accomplished. Furthermore the guide strip can also be injected onto the shade length by means of an injection molding process or can be attached to it by bonding. In the later case, preferably before bonding, a film is placed between the guide strip and the shade length and acts as an adhesive, for example, by melting in the bonding process and thus improves the bonded connection in this way. Advantageously, a plastic, especially a fiber-reinforced plastic can be used in extrusion and bonding.

In another preferred embodiment of the invention, the guide is comprised of a bottom part and a cover which is attached on this bottom part, but in especially preferred embodiments, this guide can also be made in one piece. Furthermore, a one-piece guide can have a bending line. In the latter embodiment the guide is produced in the bent-up form; this facilitates extrusion of such a profile especially for small gap sizes. Then, the guide, before and after placing the guide strip, is bent down such that only the exit gap remains open. If the guide strip is inserted later, it must be threaded into the guide from the front or back.

In another preferred embodiment of the invention, the guide strip is made from a flexible material in order to enable winding onto the roller tube, and for example, the guide strip can be produced from a flexible metal. This metal strip can additionally be injected on the edge, for example, with plastic, optionally glass fiber-reinforced, to reduce noise, friction and wear.

In other embodiments of the invention with a pull, preferably a guide rail is used which contains both a pull guide and also the guide of the guide strip. Thus in turn the production costs of the guides as well as installation costs can be reduced. In other preferred embodiments of the invention, the shade length in the regions in which the guide strip and pull meet one another or have the smallest distance to one another have a reinforcing element which is used to reduce the shear forces which act on the shade length and thus to prevent the shade length from tearing. This reinforcing element can either connect the pull and the guide strip directly to one another or in alternative embodiments can be attached such that it is attached in the vicinity of the pull and guide strip without, however, one or the other or both elements being in direct contact with one another. Preferably metal or plastic strips are used which are cemented along the drawing direction of the shade, or in the case of plastic are also vapor deposited or injected on.

One especially preferred version of the invention arises when the guide strip is used at the same time as a drive element by its pushing the shade length, moved by a drive, when the roller tube is being unwound. Preferably, the guide strip is guided compressively stiff or is itself compressive stiff as dictated by construction. If the guide strip together with the shade length is wound onto the roller tube, upon unwinding, it can move the shade length. Preferably this takes place by its moving the pull of the shade length.

In another aspect of the invention, the shade arrangement for a motor vehicle has a constant force spring which is connected, on the one hand, to the shade length, and on the other to the roller tube. This constant force spring is formed of a helically wound spring element of flat strip, preferably flat metal strip, and in accordance with the invention, the outer end of the helix is connected to the shade length and the inner end of the helix to the roller tube. In this connection, on the one hand, the relatively simple installation of a constant force spring in the shade arrangement in accordance with the invention is advantageous, replacing the former reset springs, for example, in the form of torsion springs here. On the other hand, in this way, an especially stable and wear-resistant design is achieved. Furthermore, it is especially advantageous that for a constant force spring by definition a constant reset force is available relatively independently of the drawing length. In reset springs of conventional design conversely the reset force is much greater with the shade length completely drawn than for short drawing paths.

In another approach, at least one roller tube is formed by the constant force spring to which the shade length is connected and which contains a helically wound spring element of flat strip with an inside end which forms at least one turn for winding the shade length in any operating position of the shade length. Instead of providing a separate roller tube, the coiled part of the constant force spring is used as a roller tube for taking up the shade length, the weight and production costs being reduced by eliminating a separate roller tube.

In one especially preferred version of this invention, the constant force spring is connected to a drive such as, for example, an electric motor such that it is uncoiled to extend the shade length by the drive and accordingly moves the shade length. It is advantageous in this connection that the constant force spring, in this case, provide not only for tensioning of the shade by its reset force, but also moves the shade length itself, which makes a separate drive cable or toothed belt superfluous.

Preferably, the flat strip of the constant force spring in the region of the drawn shade lengths is guided in a linear guide and for especially preferred embodiments of the invention both pull guides and also the guide of the flat strip are contained in a common guide rail, by which in turn production and installation costs can be reduced.

In another embodiment of this invention, the shade length is connected to a braking device of constant braking force which fixes the shade length in any position. Thus a continuously drawable shade length, for example, for movement by hand can be implemented. Preferably the arrangement is made in this connection such that the friction which occurs on the guide strip is at least slightly greater than the reset force which is made available on the roller tube for taking up the shade length, so that the guide strip in conjunction with its roof-side guide assumes the function of the braking device.

In one especially preferred version of the invention, the flat strip of the constant force spring is used at the same time as a guide strip of the shade length. In this case the constant force spring altogether assumes up to four functions, specifically side guidance, and thus, transverse tensioning of the shade length, via its reset force the lengthwise tensioning of the shade length, furthermore pushing out and pulling back the pull and the function of a take-up roller onto which the shade length is taken up.

The invention is explained in detail below with reference to the accompanying drawings.

DETAILED DESCRIPTION OF THE INVENTION

Figure 1:
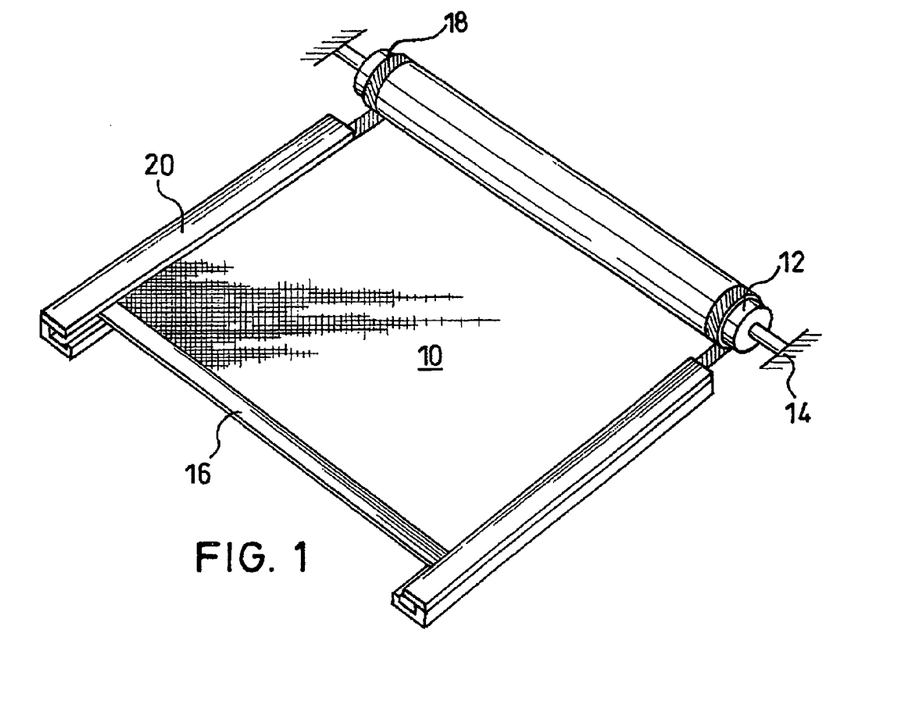
FIG. 1 shows a schematic view of the shade arrangement in accordance with the invention with guide strips.

FIG. 1 shows a shade arrangement in accordance with the invention with a shade length 10 which can be wound and unwound from a roller tube 12 and thus can be moved along two guides 20. The roller tube 12 is pivotally mounted by means of body-mounted bearings 14 and on the end of the shade length 10 facing away from the roller tube the shade length is attached to a pull 16. On either side of the shade length 10, a respective guide strip 18 is guided in the guides 20 and is connected to the shade length and wound together with it onto the roller tube 12. The guide strips 18 are guided on both sides in the guides 20 such that the shade length 10, but not the two guide strips 18, can emerge from the guide 20 through an opening of the guides 20. At a corresponding distance of the two guides 20, on the two side edges of the shade length 20 compared to the width of the shade length, the latter can itself be tensioned transversely to its drawing direction, such that, for example, fluttering of the shade length is prevented. This is especially advantageous when the shade length 10 is used to shade a roof opening in the region of the vehicle roof, and the roof opening is partially opened so that an air draft can hit the shade length 10.

Figure 2A:
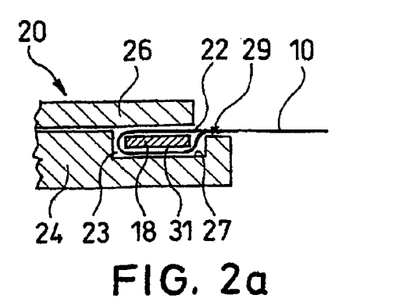
FIGS. 2a & b show different alternative embodiments of guides for guide strips.
Figure 2B:
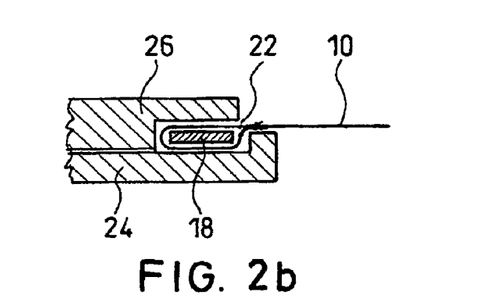

Details on the execution of the guide 20 from FIG. 1 are shown in cross section in two alternative embodiments in FIGS. 2a & 2b. In the version of FIG. 2a, the guide 20 is formed of a bottom part 24 which is made as a guide rail, and a straight cover 26 which closes the bottom part except for an exit gap 22. The guide 20 thus forms a guide channel 23 with a bottom 27 which lies in the plane which runs parallel to the clamped shade length 10. In the guide channel 23 the guide strip 18 is movably guided, the guide strip itself being connected to the shade length 10 by the shade length being guided around the guide strip in the form of a pocket and being sewn in a seam 29. The guide channel 23 here has an inside height which is slightly greater than the height of the guide strip 18 together with the pocket of the shade length 10. The bottom part 24 and cover 26 can be screwed, clipped or cemented to one another or in alternative embodiments their location against one another can be interchanged. The advantage of this embodiment is, among others, that both the bottom part 24 and also the cover 26 have the same cross section over their entire length, and thus, can be relatively easily extruded.

In an alternative embodiment the bottom part 24 and the cover 26 can also be produced in one part. Then, the cover and bottom part can be first bent up either before insertion of the guide strip or after insertion are bent together such that an exit gap remains with the correspondingly dimensioned opening. Alternatively, the guide strip with the shade length is threaded into the one-piece guide.

In accordance with the invention, the opening of the exit gap 22 is dimensioned such that the shade length 10 can emerge from the guide 20, but not the guide strip 18 attached to the shade length. The base surface 31 of the guide strip 18 thus remains both in the drawn region of the shade length 10 which is not shown here, and also on the roller tube 12 parallel to the adjacent shade length.

In the alternative embodiment of the guide 20 shown in FIG. 2b, both the bottom part 24 and also the cover 26 are L-sections which are shaped and assembled such that in turn an exit gap 22 accordingly remains free, by which (similarly to FIG. 2a) the shade length 10 can emerge from the guide 20.

Figure 3A:
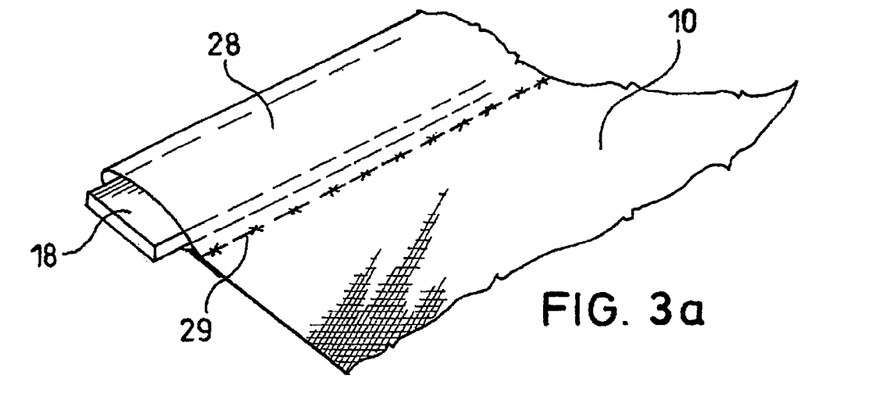
FIGS. 3a to c show different alternative embodiments for connection of guide strips to a shade arrangement.
Figure 3B:
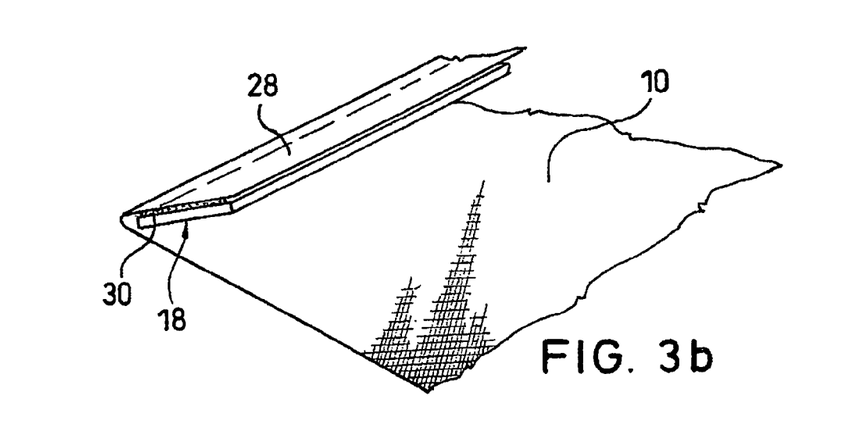
Figure 3C:
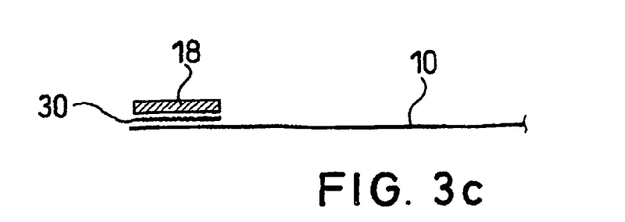

FIGS. 3a, 3b, and 3c show three alternative embodiments for attachment of a guide strip 18 to a shade length 10. In the embodiment of FIG. 3a the shade length 10 is folded laterally and thus forms a cuff 28. The edge of the cuff 28 is connected to the shade length 10 by a seam 29. Alternatively this edge can however also be cemented or bonded to the shade length 10. The pocket-shaped cuff 28 of the shade length 10 ensures that it is guided laterally by the guide strip 18 which is enclosed in the cuff. Thus the guide strip 18 of the shade length 10 can be tensioned transversely to its drawing direction.

In the embodiment shown in FIG. 3b, the shade length 10, similarly to the one from FIG. 3a, has a cuff 28 with an edge which, however, is not sewn to the shade length or in some other way joined fast. In the fold-like cuff 28 in turn a guide strip 18 is inserted and in this case connected to the shade length 10 by means of cement 30. The cement 30 can be, for example, a layer of liquid cement or also a two-sided adhesive tape. This cement 30 can also be omitted in another alternative embodiment of the invention (not shown). The guide strip 18 is then held only by the clamping action of the fold-like cuff 28, on the one hand, and the contact pressure of the individual material layers of the shade length 10 on the roller tube (not shown in FIGS. 3a to 3c).

Another alternative embodiment of fixing of the guide strip 18 on a shade length 10 is shown in FIG. 3c. Here, the shade length does not have a cuff or fold and the guide strip is connected to the shade length solely via cement 30.

Figure 4:
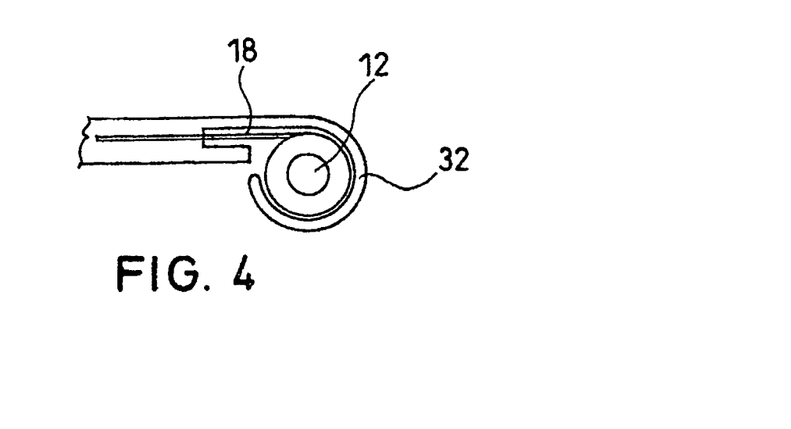
FIG. 4 shows a partial view, from the side, of a roller tube and a guide strip.

FIG. 4 shows an embodiment of the invention with a partial view of the roller tube 12 with a guide 32 which partially encompasses the roller tube, from the side. In this alternative embodiment of the invention, a guide strip 18 is used not only for lateral guidance of the shade length in order to tension the shade length transversely to its drawing direction, but the guide strip is used at the same time as a driving medium for the shade length. This assumes that the guide strip 18 is guided compressive stiff not only laterally from the drawn shade length, as is shown, for example, in FIGS. 2a and 2b, but when the shade length is driven via the roller tube 12 corresponding compressively stiff guidance of the guide strip or strips around the roller tube must be ensured. This compressively stiff guidance of the guide strip 18 is ensured by the illustrated guide 32 which partially encompasses the roller tube 12 in the manner of a claw. In this embodiment of the invention it is especially advantageous that both the lateral guide and also the drive medium are formed by the guide strip 18 of the shade length. An additional drive medium such as, for example, a compressively stiff cable or a toothed belt which is guided compressively stiffly can thus be omitted.

Figure 5:
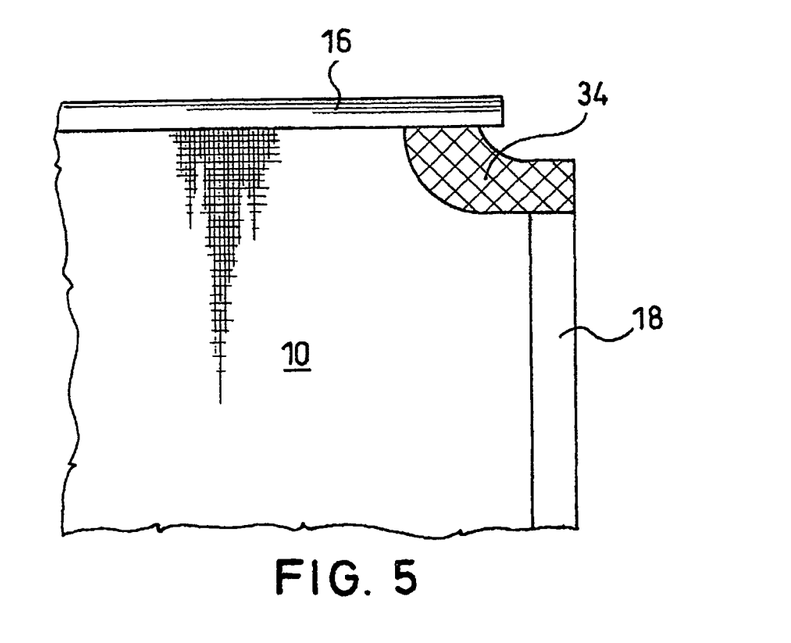
FIG. 5 shows a partial view of a shade length in accordance with the invention in the corner region with reinforcement.

FIG. 5 shows a shade length 10 which has reinforcement 34 in the corner region adjacent to the pull 16 and the guide strip 18. This reinforcement 34 is used to reduce the shear forces acting on the shade length 10 in this corner region. These shear forces can occur especially when the guide strip 18 is slightly tilted in a guide which is not shown here when the shade length 10 is drawn by means of the pull 16, or when, for example, the guide strip 18 guided compressively stiffly is also used as the drive medium for the shade arrangement and also for embodiments in which the guide strip 18 is made as a constant force spring. In the latter embodiment, the guide strip 18 is used, in addition to its function as a lateral guide for the shade length 10, also as a reset spring for the shade length in order to also keep it tensioned in any drawing position along the drawing direction. As is shown in FIG. 5, the reinforcement 34 can be attached to the shade length 10, and at the same time, the guide strip 18 can be joined directly to the pull 16. Thus, there is a frictional connection between the guide strip 18 and the pull 16.

Alternatively, the corresponding reinforcement can also be attached in the corner region of the shade length without the reinforcement itself being directly connected to the pull or guideway. In particular, for an elongated (stretched in the drawing direction of the shape) reinforcing element which is connected only to the shade length, the shear forces can also be distributed along the shade length and tearing of the shade length and of the guide strip 18 can be avoided.

Figure 6A:
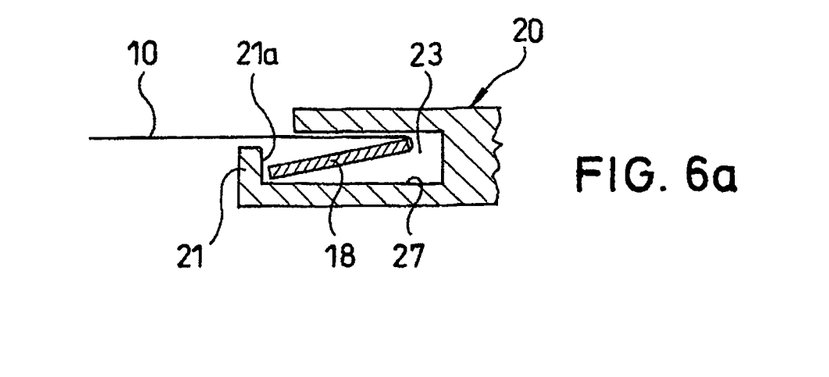
FIG. 6a shows an alternative embodiment of a guide with the guide strip tilted.

FIG. 6a shows a cross-sectional view of another guide 20 for a guide strip 18 with a shade length 10 attached to the guide strip. The guide strip 18 is cemented here into the edge cuff of the shade length 10 in turn as in FIG. 3b. The guide channel 23 of the guide 20 for the guide strip 18, however, in contrast to the guides of FIGS. 2a & 2b, has a much greater inside height than the guide strip 18 contained therein together with the shade length 10. This results in that the guide strip 18 being angled by the tensile stress of the shade length 10 within the guide channel which itself runs with its bottom (as in FIGS. 2a & 2b) parallel to the shade length. This angling additionally protects the guide strip 18 against sliding out of the guide 20. This effect can be enhanced when a crosspiece 21 of the guide 20 does not have a vertical inside surface, as shown here, but this inside surface is tilted toward the guide strip 18.

Figure 6B:
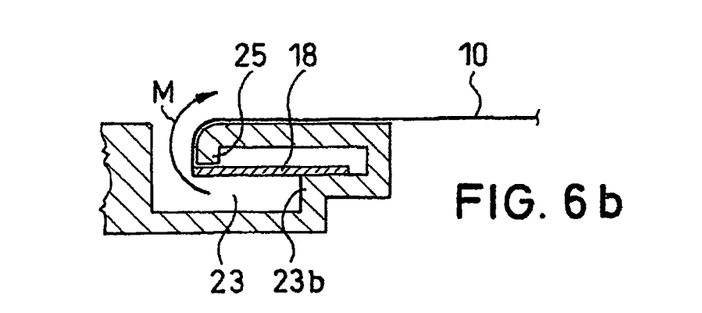
FIG. 6b shows another alternative embodiment of a guide.

FIG. 6b shows an embodiment of the invention in which a guide strip 18 is guided in the guide channel 23 and a tensioned shade length 10 applies a torque M (see directions of arrows) to the guide strip, which torque advantageously acts around a pivot in the vicinity of the middle of the guide strip. The guide strip 18 is supported on the rib 25 in the vicinity of the guide strip and one edge or step 23b of the guide channel 23 and is thus protected against twisting.

Figure 7:
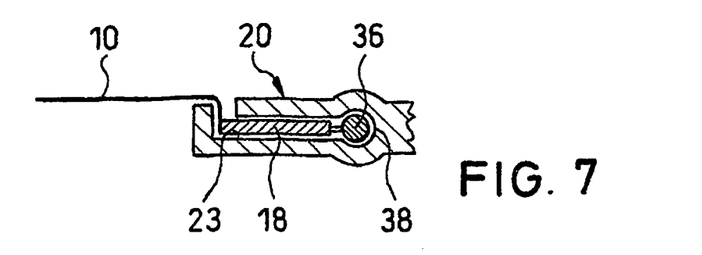
FIG. 7 shows a guide rail with a guide for a guide strip and a cable guide with a drive cable.

The guide 20 shown in FIG. 7 has a cable guide 38 in which a separate drive cable 36 is guided. It is connected to a guide strip 18 which in turn guides a shade length 10. For this purpose the guide channel 23 in which the guide strip 18 runs is open to the cable guide 38. Thus, here a driving force of a drive which is not shown is transmitted by the drive cable 36 and not by the guide strip 18 alone to the shade length 10 or optionally a pull.

Figure 8:
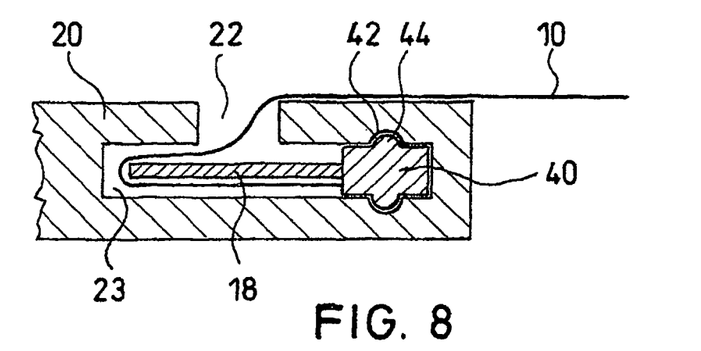
FIG. 8 shows a guide rail to which the slide rail is attached.

FIG. 8 shows a guide strip 18 which is in sliding contact with a guide 20 via the slide rail 40. The slide rail 40 is inserted into the guide 20 and is advantageously connected to it. With a corresponding choice of the materials of the slide rail 40 and the guide 20, the sliding properties can thus be improved. The guide 20 within the guide channel 23 above and below the slide rail 40 has one groove 42 at a time which is engaged by a bead 44 of the slide rail. In this way, movement of the slide rail transversely to the drawing direction of the guide strip 18 is prevented. A shade length 10 which leaves the guide channel through the exit gap 22 is attached to the guide strip 18.

Figure 9:
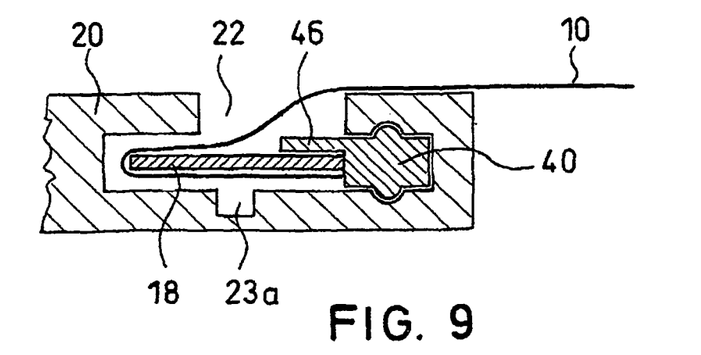
FIG. 9 shows another alternative embodiment of a guide with a slide rail.

FIG. 9 shows an arrangement similar to the one from FIG. 8, the slide rail 40 here additionally having a projection 46 which partially covers an exit gap 22 so that its effective opening is reduced. Thus, a guide 20 with a larger opening of the exit gap 22 and thus better access to a guide strip 18 which is guided in it can be implemented without the guide strip in operation being able to leave the guide channel 23. The guide channel 23 has a groove 23a which can hold a drive cable, and furthermore, can be used as a dirt channel.

Figure 10:
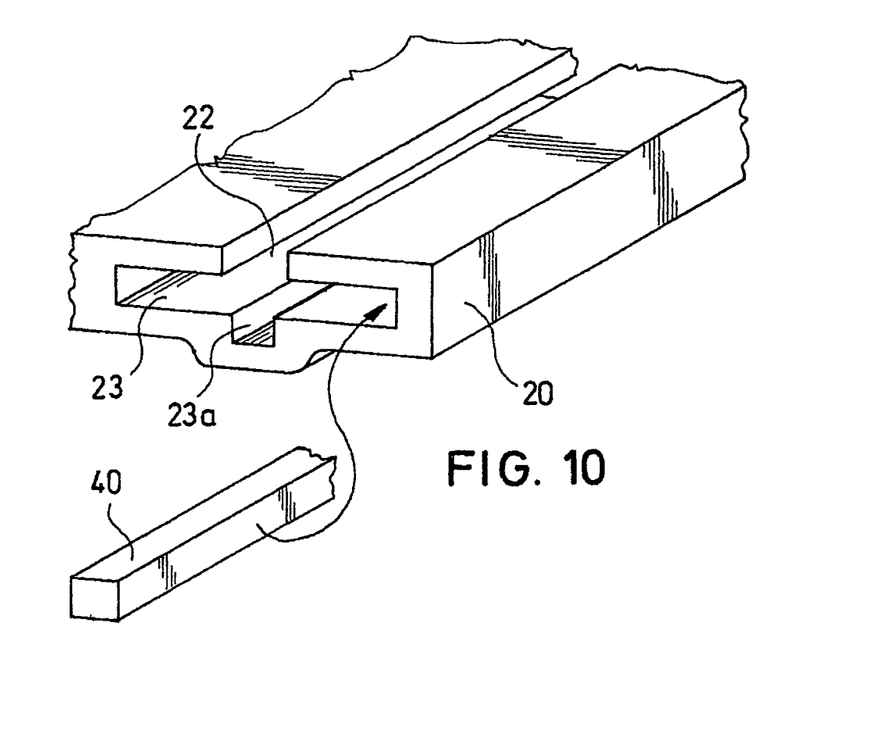
FIG. 10 shows a guide channel with a cross-shaped cross section.

FIG. 10 shows a perspective cross-sectional view of a guide 20 with a cross-shaped guide channel 23. The guide channel 23, opposite the exit gap 22 which is opened to the top, has a groove 23a (similar to as in FIG. 9) which can hold a drive cable. As indicated with the arrow, in installation, on the side facing the shade length, a slide rail is 40 is inserted into the guide channel 23 to reduce the friction between a guide strip (not shown here) and the guide 20. Alternatively such a slide rail 40 can also be located on both sides of the guide channel 23.

Figure 11:
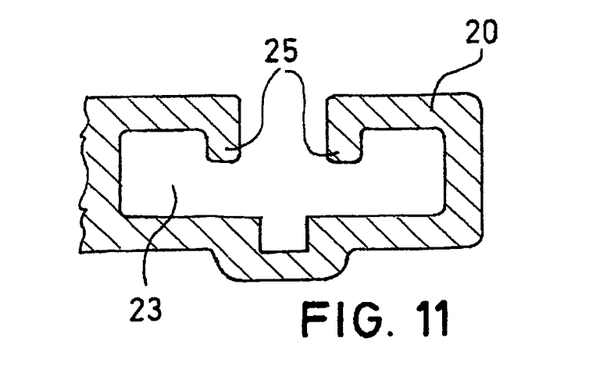
FIG. 11 shows a guide channel with a cross-shaped cross section and ribs for reducing friction.

FIG. 11 shows a cross section through a guide 20 in which a guide channel 23, similar to FIG. 10, has a basic cross shape, but here, in addition, ribs 25 are molded onto the guide which reduce the support surface of a guide strip (not shown here) on the guide in order to improve the sliding properties of the guide strip in the guide.

Figure 12:
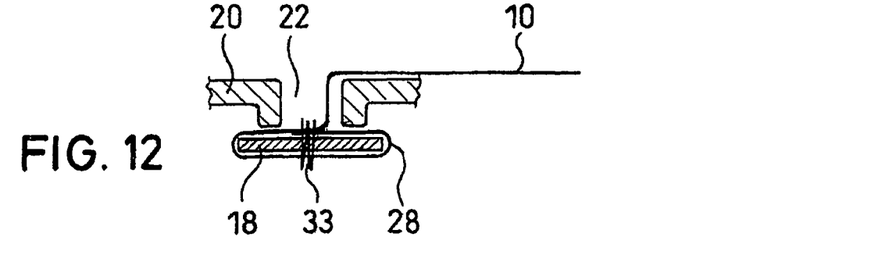
FIG. 12 shows a shade arrangement with a pocket-shaped edge of a shade length and a sewn-through guide strip.
Figure 13:
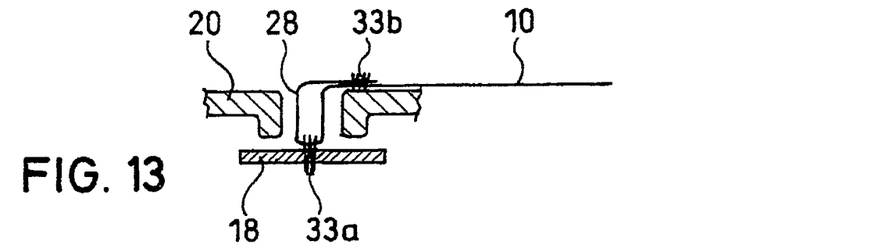
FIG. 13 shows a shade arrangement with a peripherally sewn edge of a shade length and a sewn-through guide strip.

FIGS. 12 & 13 show other versions for attachment of a guide strip 18 to a shade length 10 in which a seam runs through the guide strip. This type of attachment is especially considered for flexible, soft guide strips of plastic. In the embodiments of FIGS. 12 and 13, a cuff 28 of the shade length 10 is formed by means of a seam 33 and 33b. In the embodiment of FIG. 12, the guide strip is inserted into this cuff 28 and at the same time is fixed to the seam 33. Conversely, in the embodiment of FIG. 13, the guide strip is sewn with a second seam 33a to the edge of the cuff 28. In the latter version the guide strip 18 slides directly on the guide 20 so that here the shade length 10 cannot be rubbed through between the guide strip and the guide.

Figure 14:
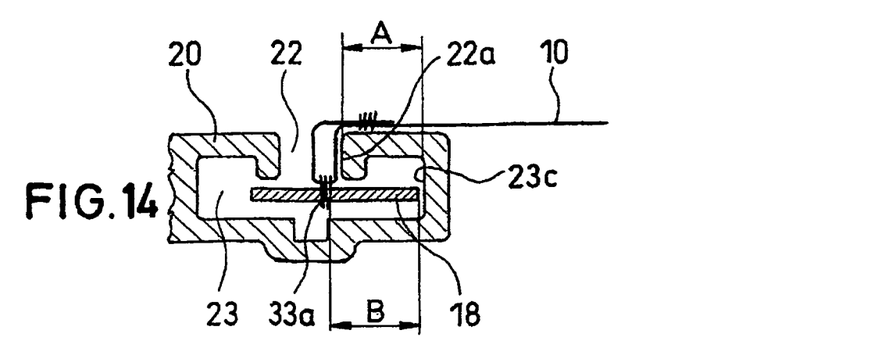
FIG. 14 shows the overall cross section through the guide of FIG. 13.

FIG. 14 shows a complete cross section through the guide channel of the embodiment of FIG. 13. As FIG. 14 shows, the distance B of the seam 33a to the side edge of the guide strip can be chosen to be somewhat larger than the distance A of the edge 22a of the exit gap 22 to the inside surface 23c of the guide channel 23 which is assigned to it. This prevents the shade length 10 from being worn through on the inside surface 23c. In general the contact pressure of the shade length 10 against the edge 22a and the guide strip 18 against the inside surface 23c of the guide 20 can be set by the corresponding dimensioning of these distances A and B.

Figure 15:
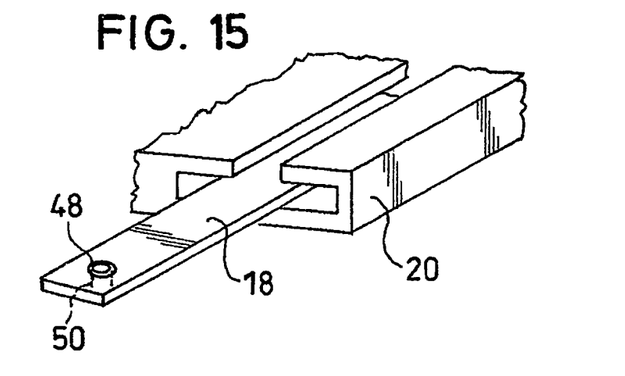
FIG. 15 shows a guide strip with a hollow rivet for attachment of a slider.

How a guide strip can be joined, for example, to a shade length, a slider or to a pull will be explained below using FIGS. 15 & 16. FIG. 15, here, shows a guide strip 18 in a guide 20 in a perspective view, the guide strip on its end facing the pull or a drawing end of a shade length having in a hole 50 a hollow rivet 48, by means of which or by which linkage takes place. Of course, linkage to the hole 50 can also take place in some other way, for example, by a screw connection.

Figure 16:
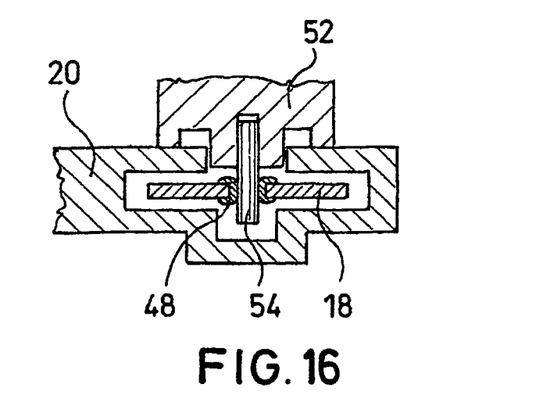
FIG. 16 shows a cross section through a guide strip with a slider.

FIG. 16 shows a guide strip 18 in a guide 20, here too the guide strip having a hollow rivet 48 for linkage. To link the guide strip 18 to a slider 52 a pin 54 sticks in it and is likewise guided through the hollow rivet 48. Thus, an interference connection between the guide strip 18 and the slider 52 is ensured. Furthermore, a pull (not shown here) can be connected to the slider 52 to extend or retract the guide strip 18 and thus the shade length.

Figure 17:
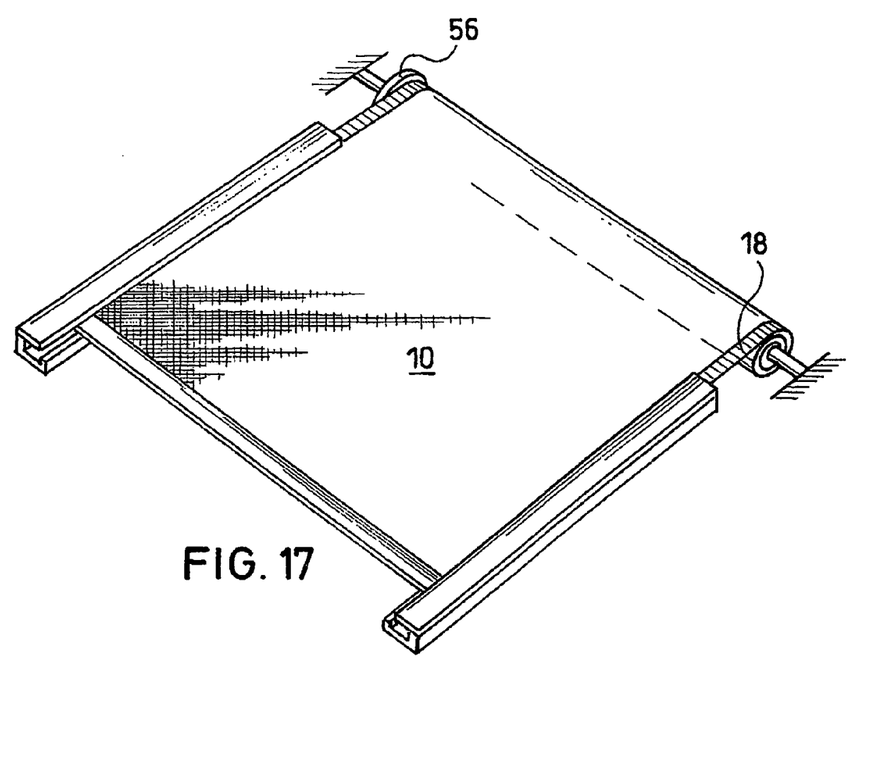
FIG. 17 shows a shade arrangement in which the guide strips are used at the same time as a take-up roller.

One embodiment of a shade arrangement without a separate roller tube is shown in FIG. 17. In this connection, two guide strips 18 are used which are attached to either side of a shade length 10, simultaneously as roller tubes, as guide elements, as compressively stiff drive elements and as reset springs. The guide strips 18 are metal, constant force springs which can be helically coiled and uncoiled in order to move the shade length 10. For this purpose, they can be connected to a pull (not shown here) on the end of the shade length 10. Thus the guide strips 18 which are made as constant force springs on the one hand replace conventional additional spring elements (for example, torsion springs) for pulling back the shade length 12, while on the other hand their coiled region replaces existing separate roller shafts. On either side of the taken-up shade length there can be two disks 56, of which only one is shown in FIG. 17, which are used as guides in the winding process.

What is claimed is:

1. Shade arrangement for a motor vehicle, comprising:
at least one shade length and
at least one roller tube for taking-up and unrolling the shade length,
at least one flexible, flat guide strip connected to the shade length and having an inherently flat shape and extending along each of opposite side edge regions of the shade length in a drawing direction of the shade, and
a guide at each side of the shade length for guiding a respective said guide strip in its inherently flat shape;
wherein the guide contains a guide channel in which the respective guide strip is guided and which has an exit gap through which the shade length emerges from the guide,
wherein the height of the exit gap of the guide channel is greater than the combined height of the guide strip,
wherein the shade length is attached to an edge of the guide strip in a manner causing an inherent tension of the shade length to apply a torque to the edge of the guide strip that pulls the end of the guide strip against facing surfaces of the guide channel in a manner preventing the guide strip from emerging from the exit gap, and
wherein the flat shape of the guide strip is maintained as it travels within the guide channel and as it travels from within the guide channel to and from the at least one roller tube
wherein the edge of the guide strip to which the shade length is attached is an outermost edge that is closest to said exit gap, wherein a rib projects substantially perpendicular to the drawing direction into the guide channel in the vicinity of said exit gap, wherein a step is provided at an inner area of the guide channel away from the exit gap and projecting in a direction opposed to the rib, wherein the guide strip is disposed between the rib and the step, and wherein said torque causes the guides strip to be supported against the rib and the step.

2. Shade arrangement as claimed in claim 1, wherein the guide strip is guided in a guide channel within the guide, a bottom of the guide channel running in a plane parallel to the drawing direction of the shade length and the guide strip the flat shape of the guide strip being parallel to said bottom of the guide channel as it is guided.

3. Shade arrangement as claimed in claim 1, wherein the guide strip is taken up on the roller tube together with the shade length.

4. Shade arrangement as claimed in claims 1, wherein the guide strip is cemented onto the shade length.

5. Shade arrangement as claimed in claim 1, wherein the guide strip is extruded onto the shade length.

6. Shade arrangement as claimed in claim 1, wherein the guide strip is injection molded onto the shade length.

7. Shade arrangement as claimed in claim 1, wherein the guide strip is bonded onto the shade length.

8. Shade arrangement as claimed in claim 7, wherein an adhesive film is provided between the guide strip and the shade length.

9. Shade arrangement as claimed in claim 1, wherein the guide is comprised of a lower part and a cover.

10. Shade arrangement as claimed in claim 1, wherein the guide strip is made of metal.

11. Shade arrangement as claimed in claim 1, wherein the guide strip is comprised of a metal strip which is peripherally sprayed with plastic.

12. Shade arrangement as claimed in claim 1, wherein the guide strip is made of plastic.

13. Shade arrangement as claimed in claim 12, wherein the plastic is reinforced with glass fibers.

14. Shade arrangement as claimed in claim 1, wherein further comprising a drive and wherein the guide strip is connected to the drive such that the drive can unroll the shade length via the guide strip.

15. Shade arrangement as claimed in claim 14, wherein the guide strip is compressively stiff.

* * * * *